United States Patent [19]

Eigenmann

[11] E Patent Number: Re. 31,669

[45] Reissued Date of Patent: Sep. 11, 1984

[54] ANTI-SKID, WEAR- AND STRESS-RESISTING ROAD MARKING TAPE MATERIAL

[76] Inventor: Ludwig Eigenmann, Vacallo, Ticino, Switzerland

[21] Appl. No.: 290,792

[22] Filed: Aug. 3, 1981

Related U.S. Patent Documents

Reissue of:

[64] Patent No.: 4,146,635
Issued: Mar. 27, 1979
Appl. No.: 787,954
Filed: Apr. 15, 1977

U.S. Applications:

[63] Continuation of Ser. No. 123,792, Feb. 22, 1980, abandoned.

[30] Foreign Application Priority Data

Apr. 15, 1976 [IT] Italy ..... 22353 A/76
Oct. 27, 1976 [IT] Italy ..... 22354 A/76

[51] Int. Cl.[3] ..... B32B 5/16; E01C 11/24; E01F 9/08

[52] U.S. Cl. ..... 428/283; 350/105; 404/12; 404/14; 404/19; 404/20; 428/285; 428/286; 428/287; 428/290; 428/291; 428/323; 428/325; 428/328; 428/329; 428/340; 428/354; 428/489

[58] Field of Search ..... 350/105, 104, 106, 109; 404/12, 14, 19, 20, 9; 428/283, 285, 287, 290, 291, 323, 325, 328, 329, 340, 354, 489, 212, 213, 215, 219, 220, 284, 286, 289, 331, 332, 334, 339, 341, 343, 353, 355, 413–415, 417, 426, 430, 431, 480; 427/136–139

[56] References Cited

U.S. PATENT DOCUMENTS

| | | | |
|---|---|---|---|
| 3,399,607 | 9/1968 | Eigenmann | 404/19 X |
| 3,587,415 | 6/1971 | Eigenmann | 404/9 |
| 3,746,425 | 7/1973 | Eigenmann | 404/14 X |
| 3,782,843 | 1/1974 | Eigenmann | 404/9 |
| 3,788,879 | 1/1974 | Waysman | 428/210 X |
| 3,879,148 | 4/1975 | Eigenmann | 404/10 |
| 3,935,365 | 1/1976 | Eigenmann | 428/323 |
| 4,020,211 | 4/1977 | Eigenmann | 428/323 |

*Primary Examiner*—Bruce H. Hess
*Attorney, Agent, or Firm*—Michael J. Striker

[57] ABSTRACT

An improved multi-layer surface marking tape material for use on roadway pavements so as to provide a traffic regulating indicium thereon, and having an anti-skid and wear-resisting upper layer and a lower primer layer for connecting the material to said pavement, the new multi-layer tape material comprising further an intermediate relatively thin, pliable, essentially inextensible and tensionally resistant intermediate layer compatible with and intimately connected to both said layers for distributing and transferring over a large primer layer-roadway pavement interfacial area horizontally directed stresses tangentially applied to said anti-skid upper layer at localized upper layer-vehicle wheel treads interfacial areas.

6 Claims, 8 Drawing Figures

FIG. 1
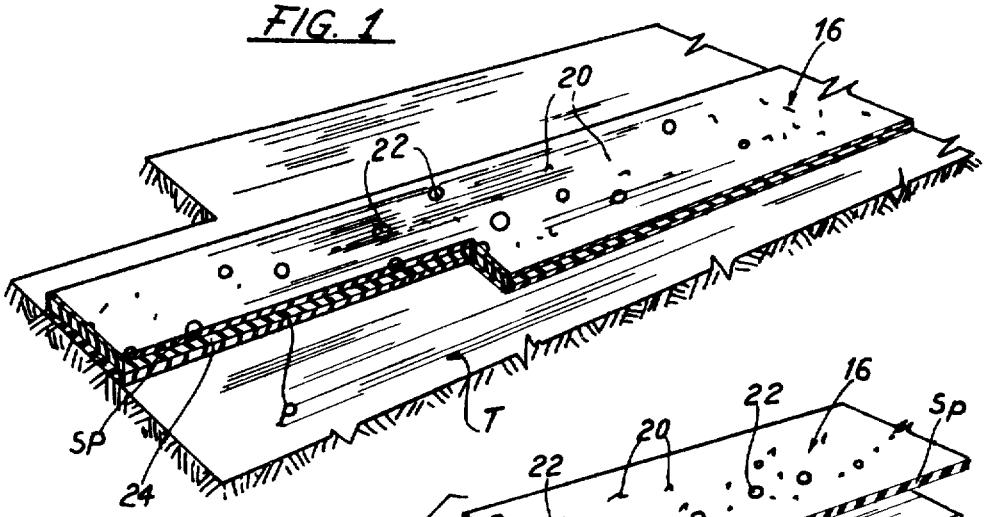
FIG. 2
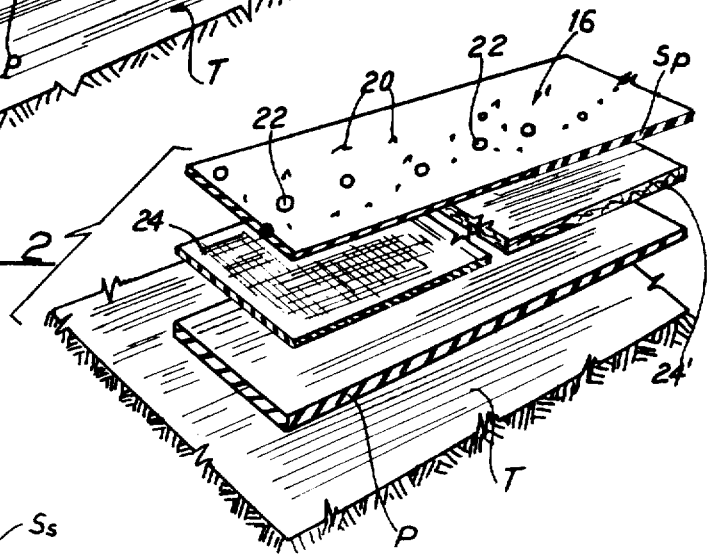
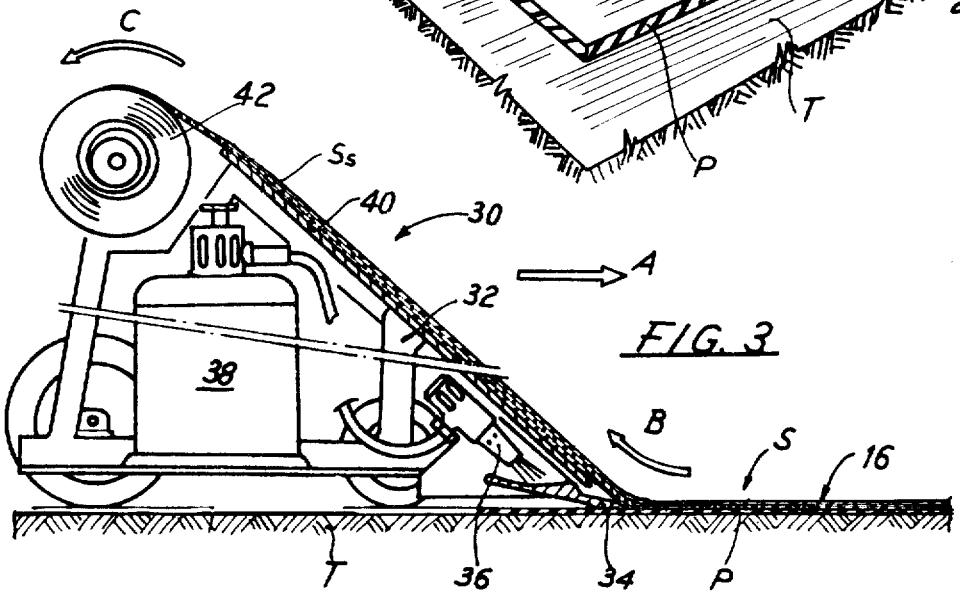
FIG. 3

Sp
Sp + Snt
Snt
Sp
Snt

Sp
Sp+Snt

Sp
Sp+F
F+Snt
Snt
Sp
F
Snt

Sp
Snt
P+
Snt
P
Sp
F
Snt
P
T

Sp
Sp+
Snt
F+
P
P
Sp
Snt
F
P
T

Sp+Snt
P+Snt
Sp
Snt
P
T

ANTI-SKID, WEAR- AND STRESS-RESISTING ROAD MARKING TAPE MATERIAL

Matter enclosed in heavy brackets [ ] appears in the original patent but forms no part of this reissue specification; matter printed in italics indicates the additions made by reissue.

*This is a continuation of application Ser. No. 123,792, filed Feb. 22, 1980, now abandoned.*

BACKGROUND OF THE INVENTION

1. Field of the Invention

This invention relates to road surface marking tape materials for use on roadway pavements so as to provide a traffic regulating indicium thereon, such as traffic lane dividing lines, road lane edges defining lines and so on. More particularly, this invention relates to prefabricated tape material having wear-resisting properties, and principally (as far as the invention is concerned) anti-skid properties, provided by the fact that the material has a smooth highly wear resisting planar surface layer and a plurality of hard crystalline particles at least some of which include an upper portion extending outwardly from the upper face of said layer to impart good anti-skid properties to said face for vehicle traffic safety. The tape material concerned with the invention being also of the kind designed to be applied on and secured to the roadway pavement by means of lower "primer" layer best suitable for its anchorage with the pavement.

2. Description of the Prior Art

This art is a well known and worked one and several improvements had been made thereto. A number of Patents had been issued to the present applicant thereabout. Reference is herein made to the U.S. Pat. Nos. 3,872,843 and 3,935,365 for more complete acknowledgement of such prior art and of the problems concerned therewith.

One important problem descends from the most desirable anti-skid property of the material. The upper surface of the tape in service is firmly engaged by the vehicle wheel treads and therefore powerful thrusts occur to be applied tangentially on the said surface (the term "tangentially" refers to the wheel tread where contacting the said surface, that is directed in the plane defined by said surface), extremely powerful forces can be for example originated by a heavy and/or fastly traveling vehicle engaged in an emergency braking or by the centrifugal force during a curve. These thrusts tend to displace the tape in the direction of the force, that is cause the tape material to "slide" on the road pavement, detaching said tape from said pavement.

On the other hand such powerful thrusts are applied on the tape surface at a rather small surface area thereof, that is at the wheel tread-tape surface interface. Now, the tape material is secured to the (generally bitumen based) roadway pavement by means of an essentially plastic composition, even if the primer layer comprises completely hardened bituminous components. The resistance to said tendency of horizontally displacing the tape, under said thrusts, can provided at the tape material-road pavement interface (more properly, interlayer) at a very greater interfacial area.

In the practical service of said road marking tapes, as known to those skilled in the art, a tangentially applied powerful thrust can cause and frequently causes a localized damage to the tape material, which locally flakes off and wrinkles up, and sometimes is torn apart.

Complemental problems concern the desirable provision of tape material of small overall thickness (both for economy reasons and for limiting its overall height or protrusion from the actual road pavement surface) and the difficult and hard and fatiguing operation of removing, when necessary, a properly applied and secured marking tape from the road pavement, for example when the location of the marking is to be modified.

SUMMARY OF THE INVENTION

It is therefore an object of this invention to provide a new and improved tape material which is not subject to the above and other objections. In other words, it is an object of this invention to properly and satisfyingly solve the above and other problems.

More specifically, it is an object of this invention to provide a new and improved road surface marking tape material, which when applied and in service on a roadway pavement, has a multi-layer structure including a lower primer layer firmly secured to said pavement at a large interfacial area (such as that defined by the entire width by a substantial length of the tape), an upper traffic wear resisting and anti-skid layer the upper face of which can effectively frictionally engage the vehicles' wheel treads and transfer the tangentially applied thrusts, localized in relatively small interfacial areas, to the tape structure, and an essentially pliable but inextensible and tensionally resistant intermediate layer so connected to the said adjacent lower and upper primer and respectively anti-skid layers that the said localizedly applied thrusts are evenly distributed and transferred over a many times greater area in the said lower layer and concurrently of the roadway pavement surface.

Essentially, the road marking multi-layer tape material of the invention is therefore characterized by comprising, between a lower primer contacting and connected to the roadway pavement, and an upper layer having an anti-skid upper surface designed to be contacted and frictionally and tangentially engaged by the wheel treads of the vehicles, a relatively thin and pliable, but inextensible and tensionally resistant intermediate layer intimately and connected to both said upper and lower layers adjacent thereto at the entire interfacial area therebetween.

According to an embodiment of the invention, the said intermediate layer consists of a film of highly tensionally resistant polymeric resin. Preferably, said intermediate layer consists of a polyester film from 0.02 to 0.3 mm thick.

According to another embodiment of the invention, the said intermediate layer consists of a highly tension resistant resin impregnated non-woven fibrous structure. Preferably, said fibrous structure is impregnated at its portions adjacent to the upper and respectively to the lower layer by the same compounds comprised in said layers.

The said non-woven structure consists of fibers made of any suitable fiber forming synthetic composition capable of providing essentially inextensible and highly tensionally resistant fiber, such as polyester. The same structure can also be made of glass fibers. In such occurrence, the fibrous structure can be suitably impregnated with a synthetic rubbery or elastomeric composition for minimizing the brittleness of the fibers.

According to a complemental advantageous feature of the invention, the new tape material of the invention can be easily removed from the road pavement to the extent necessary for obliterating the marking, by inserting and displacing a heated blade at the level of the lower (or of intermediate layer, when made of heat meltable material) for separating the marking forming upper layer from the roadway pavement contacting lower or primer layer. The said upper layer can be recovered for subsequent application and use.

These and other features and advantages of the invention will be made best apparent from the following detailed description of preferred embodiments thereof, reference being made to the accompanying drawings.

BRIEF DESCRIPTION OF THE DRAWINGS

FIG. 1 is a somewhat diagrammatical, fragmentary, partly sectional perspective view of a tape material according to the invention, applied on and secured to a roadway pavement;

FIG. 2 is an exploded view of the components of the material of FIG. 1, the intermediate layer forming component being shown to illustrate two alternative embodiments thereof;

FIG. 3 is a diagrammatical side view and partly a sectional view of a mechanism adapted for removing the material from the roadway pavement;

DESCRIPTION OF THE PREFERRED EMBODIMENTS

Figure 4:
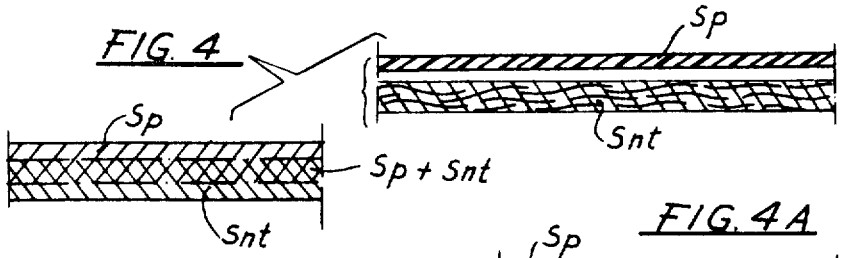
FIG. 4 is a sectional view illustrating a combination of certain components of the structure, before and after the assembling thereof.

In its broadest aspect, the tape material according to the invention comprises the combination and the arrangement of components as shown in FIG. 1. When properly laid on and secured to the surface of a roadway pavement generally indicated at T, by means of a "primer layer" (this term is of current use in the art, as being conventionally referred to a layer which is formed on the pavement surface, preparatory to laying the tape material thereon) of substantially bituminous nature, the road surface marking material has an upper face 16 which defines the sign. Said lower or primer layer is generally indicated at P.

Such upper face 16 is embodied by an upper layer $S_p$ having a high resistance to wear and formed by a highly resistant polymer, such as a polyester or a polyamide resin, and preferably of a polyurethane resin, and consists of a layer of thickness preferably comprised between 0.4 and 1.0 mm. This upper face 16 is made "antiskid" by embedding into said layer hard particle, preferably crystals or microcrystals of a substance having a hardness at least of and preferably greater than 6 on the Mohs' Hardness Scale, such as of quartz, aluminum silicofluoride, aluminum sesquioxide and preferably carborundum. Some partially protruding particles are diagrammatically shown and indicated at 20 in FIGS. 1 and 2.

The upper layer can be also provided, according to the art, with light retroreflective elements, generally spheroidal, part of which are also shown and indicated at 22.

According to the invention, the said upper layer $S_p$ and the said lower or primer layer P are interconnected by an intermediate layer which is pliable (for best adaptation of the tape material to the road pavement T unevenness, and for admitting the winding of the material into coils or bobbins, for storage and/or transportation), essentially inextensible and having a great resistance to tension. Such intermediate layer can comprise a sheet of suitable substance, such as indicated at 24, or comprise a non-woven fibrous structure, as indicated at 24' in the righthand portion of FIG. 2.

The described multi-layer structure comprises in at least one of its layers thermoplastic components. This provision can be made use of for easily detaching the tape from the road pavement by making use of a simple apparatus such as illustrated in FIG. 3, and generally indicated at 30. Such apparatus comprises a truck which can be displaced in direction A along the tape to be removed. The frame structure 32 of said truck supports a blade-like tool 34 positioned for engagement and lengthwise insertion into and below the tape material, at a level intermediate its upper mayer (generally indicated at S in FIG. 3, for simplicity) and the lower pavement engaging face of the primer layer P.

The blade tool 34 is heated for example by a burner 36 and the upper layer portion of the detached tape material can be pull up along a sloping support 40 by a recovery bobbin 42. Said upper layer portion, generally indicated at $S_s$, thus recovered, can be further made use of. This provide a substantial saving because the upper layer $S_p$ is as a matter of fact the most costly component of the product, in particular when provided with a substantial amount of corundum crystals and/or of retroreflective elements. The apparatus is complemented by the provision of a fuel source, such as a bottle 38 containing liquified gas and, is desired, with a source of power, such as an internal combustion engine, for driving the truck and/or rotating the mandrel about which the bobbin 42 is wound.

Various arrangement and interactions of the layers in a multi-layer structure in which the intermediate layer comprises a non-woven fibrous impregnated structure will be now briefly described with reference to FIGS. 4 to 8 inclusive. Such arrangements comprise preferably but not exclusively a fibrous structure formed with glass fibers.

It has been found that binder agents consisting of bituminous or epoxy-bituminous compounds are well compatible with and intimately penetrate into such fibrous structures. Upon juxtaposition of a layer $S_p$ of resinous substance, such as polyurethane, on a fibrous layer, another substantial interpenetration occurs. This greatly improved the bond between the various layers.

Further, the fibrous intermediate layer is generally preliminarily impregnated preparatory to the layer juxtaposition, and the various still liquid or viscous and not yet set compounds either forming the upper layer and/or the lower layer and impregnating the intermediate viscous layer intermix at the layers' interfaces and thereabout for further improving the bond and the structural even if heterogeneous unitarity of the multi-layer structure.

Figure 4A:
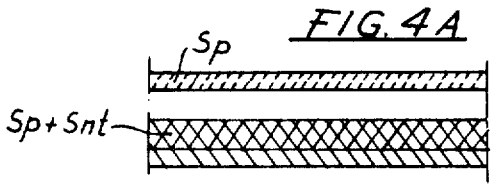
FIG. 4A is a view similar of that of the righthand part of FIG. 4 and illustrates a modified combination.

Thus, as diagrammatically shown in FIG. 4, the juxtaposition of the components of the upper layer $S_p$ and of the intermediate non-woven layer Snt yields to forming of a mixed (and possibly a chemically interreacted) interlayer Sp+Snt improving the bond. FIG. 4A diagrammatically indicates that the upper layer $S_p$ can be preliminarily formed as a calendered sheet and then coupled to the fibrous layer under pressure and vulcanization process.

Figure 5:
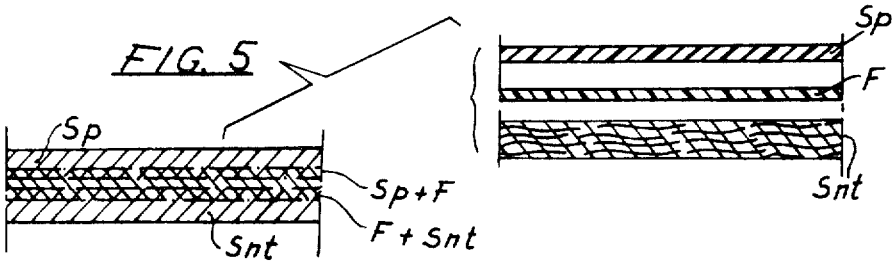
FIGS. 5, 6, 7 and 8 are views similar to that of FIG. 4 and illustrate further modified combinations, including thermoplastic components preferably comprising bituminous and/or epoxy-bituminous components.
Figure 6:
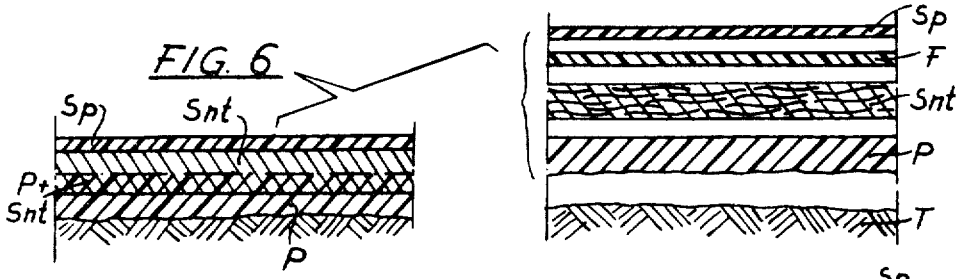
Figure 7:
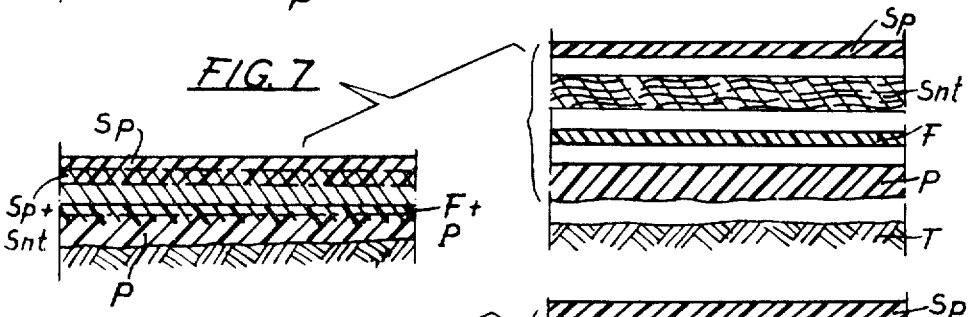
Figure 8:
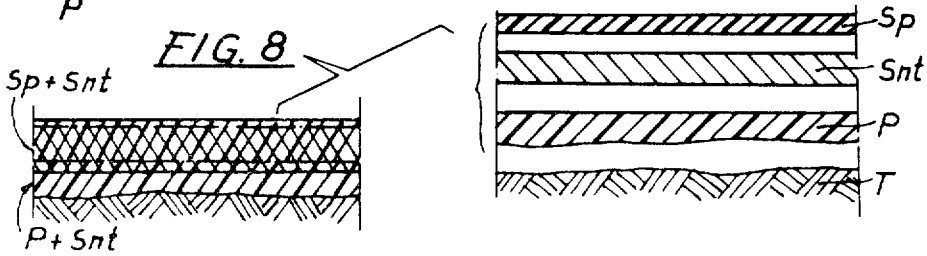

The diagram of FIG. 5 visualized the interlocation of a sheet F of a flexibilizing and/or waterproofing agent between the upper layer forming component $S_p$ and the non-woven structure Snt. In the compound product (lefthand part of the FIGURE) a plurality of interlayers is therefore formed, such as generally indicate at Sp+F and F+Snt. Correspondingly, as indicated in the diagram of FIG. 6, an interlayer of crossed impregnation P+Snt can be formed between the impregnated fibrous layer Snt and the primer layer P. FIG. 7 depicts the formation of two interlayers Sp+snt and F+P resulting from the interposition of the said flexibilizing and/or waterproofing agent F between the non-woven layer and the primer layer P. FIG. 8 finally illustrates a deep intercrossed impregnation which involves nearly the entire thickness of the fibrous layer Snt, by part of both the compounds of the upper layer $S_p$ and the primer layer P. The substances and compounds adapted for providing such interrelations will be commented in the following Examples.

EXAMPLE 1

This Example refers to the manufacture of a multilayer tape material including an intermediate layer 34 consisting of a resinous film from 0.03 to 0.3 millimeters thick. This material corresponds to the combination shown in the lefthand portion of FIG. 2. In this structure it is critical that the layer $S_p$ will be intimately and firmly bonded to the intermediate film. Assuming that such film is made of a polyester resin, the wear resisting upper layer can be made of a polyester composition as follows (in percent by weight):

| | |
|---|---|
| Polyester resin (such as "Dynapol S 206", by Dynamit Nobel A.G.) | 56% |
| Methylethylketone | 34% |
| Titanium dioxide | 10% |

EXAMPLE 2

This Example refers to forming a primer layer well adapted to provide a firm bond with an intermediate layer as above, by a two-component (A and B) composition, as follows (in parts by weight):

| | | |
|---|---|---|
| Component "A" | | |
| Solid oxidized bitumen | parts | 17 |
| Epoxy Tar (tar for epoxy resins) | parts | 10 |
| Synthetic rubber (such as "R.T.V. Rubber", by Polysar Canada) | parts | 24 |
| Colloidal silica (such as "Aerosil") | parts | 2 |
| Epoxy resin (such as "Araldite 250", by Ciba) | parts | 42 |
| Component "B" | | |
| Solid 40/50 bitumen | parts | 17 |
| Epoxy Tar | parts | 15 |
| Cresylic Acid | parts | 5 |
| Polyamide resin (such as "Versamid 140") | parts | 36 |
| Kaolin | parts | 27 |
| Accelerator for the Epoxy Resin of Component "A" (such as "D.M.P. 30") | parts | 2 |

The following Examples refer more specifically to the manufacture of tape material comprising a fibrous intermediate layer.

In general, the said fibrous intermediate layer comprises a non-woven fabric of weight comprised between 50 and 250 g/sq. meter, which is impregnated and subject to uniform pressure, by calendering for example, for providing a structure preferably of thickness less than one millimeter; a thickness comprised between 0.3 and 0.6 mm is preferred, so that the coupling of the upper layer (which includes abrasive and retroreflective elements) and on the intermediate layer forms a multilayer of thickness generally slightly above one millimeter. This feature is advantageous in view of the cost, pliableness and light weight of the material to be laid on a prepared primer layer.

The impregnation of the fibrous structure is preferably made by making use of impregnating compound having, when completely set, a substantial resiliency. These compounds comprise preferably but no critically epoxy resins, epoxy-urethane resins epoxy-nitrile resins, polyester resins and, more preferably, combinations of epoxy resins and of synthetic in particular nitrile rubbers. The impregnating compound, added to suitable accelerator agents, is applied as a solution and heat processed, when the impregnation has been completed, to provide a stable waterproof and highly resistant structure.

EXAMPLE 3

A non-woven fabric of polyester fibers, weight 75 g/sq. meter and resisting 10 kg/cm (perpendicularly to the force) is impregnated up to weight of 160 g/sq.m with the following composition (parts by weight):

| | |
|---|---|
| Nitrile rubber (such as "Chemigum N 600" by Goodyear) | 100 |
| Epoxy resin (such as "Epon 828", by Shell) | 100 |
| Zinc oxide | 5 |
| Stearic acid | 1 |
| Sulphur | 3.5 |
| Accelerator (DMP 30) | 1.5 |
| Accelerator (benzotiacyldisulphate) | 1.5 |
| Titanium dioxide | 7.5 |

This composition is soluted into a solvent consisting of 250 parts of methylethylketone peroxide and 250 parts of toluene, and subjected to a 10' treatment at 160° C.The thus impregnated and processed fibrous structure resists to tension of 20 kg/cm and has excellent waterproof and water resistant properties.

EXAMPLE 4

For the bonding of a structure obtained according to the above Example 3 with a polyurethane upper layer, the surface of said structure can be treated with a mordanting composition consisting of (parts by weight):

| | |
|---|---|
| Epoxy resin (such as "Epon 828" by Shell) | 70 |
| Polybutadiene, or Butyl rubber (such as "Polysar" Canada) | 30 |
| Polyamide (such as "Versamin 125", by Schering) | 40 |
| Titanium dioxide | 35 |
| Dibasic lead phthalate | 5 |
| Solvent (toluene) | 320 |

EXAMPLE 5

The twin layer structure comprising the intermediate layer of Example 3 can be secured to the roadway pavement upon applying and doctoring of the pavement surface a primer layer consisting of (parts by weight):

| | |
|---|---|
| Butyl rubber (such as "Polysar Butyl 301") | 100 |
| Oxidized bitumen | 15 |
| Zinc oxide | 5 |
| Stearic acid | 2 |
| Extra-fine clay ("China Clay") | 15 |
| Zinc diethylditiocarbammate | 3.5 |
| Dibenzylamine | 2 |
| Sulphur | 2 |
| Solvent (such as "Solvesso 100") | 25 |

EXAMPLE 6

The multi-layer prefabricated tape material can be provided with a compatible primer layer preliminarily applied (such as by calendering) and secured to the face of the intermediate layer, opposite to the upper layer.

Such preliminarily applied primer layer can be made by the use of the following composition (in part by weight):

| | |
|---|---|
| Butyl rubber (as above) | 100 |
| Oxidized bitumen | 65 |
| Extra-fine clay (as above) | 25 |
| Hydrocarbonic resin (such as "Piccopale 100") | 20 |
| Liquid coumarone resin (such as liquid "Cumar", by Allied) | 20 |
| Carbon black | 25 |
| Anthracene oil, or tar | 20 |

EXAMPLE 7

This Example is a modification of Example 3 and refers to a composition particularly adapted for providing a laminated or calendered sheet of the impregnating material, such as indicated at F in FIGS. 5 to 7, for example. Such composition comprises, in parts by weight:

| | |
|---|---|
| Epoxy resin (such as "Epon 828", by Shell) | 70 |
| Bromine modified butadiene rubber, capable to cross-link at ambient temperature (such as "Polysar RTV") | 30 |
| Polyamide (such as "Versamid 125", by Shering) | 40 |
| Titanium dioxide | 50 |
| Dibasic lead phthalate | 5 |
| Toluene | 180 |
| Isopropyl alcohol | 120 |

The impregnated structure is heated for 10′ at 160° C.

EXAMPLE 8

The use of fiberglass for producing the fibrous structure of the interlayer is preferably combined with the use of an essentially resilient compound for forming the upper layer $S_p$ of FIGS. 4 to 8, such as a polyurethane resin, for minimizing the brittleness of the glass; and forming a deeply compenetrated layer system. The upper layer can be made extremely thin. The advantageous provision of the flexibilizing (and waterproofing) interlayer forming component F (interlayer Sp+F, and F+Snt, and also F+P, FIGS. 5 to 7) can be provided by making use of the following composition, in parts by weight:

| | |
|---|---|
| Polyethylene chlorosulphonate (such as "Hypalon", by DuPont) | 400 |

-continued

| | |
|---|---|
| Titanium dioxide | 250 |
| Baryte | 150 |
| Kaolin clay | 150 |
| Polyester resin (such as "Neoxil") | 50 |

The thus flexibilized and/or waterproofed structures can be various formed and arranged, as examplified in FIGS. 5 to 7.

I claim:

[1. A road marking tape material comprising: a bituminous primer layer firmly attachable to a road surface; a wear- and skid-resistant upper layer having partially protruding particles of a substance having a hardness of at least 6 on the Mohs' Hardness Scale embedded therein; and an impregnant-saturated layer intermediate said primer and upper layers, said impregnant-saturated layer being completely permeated with an impregnant and additionally being partially permeated by the composition of said primer layer and by the composition forming said upper layer, said intermediate layer being a non-woven fibrous material having an unimpregnated condition a weight of about 75 g/m$^2$ and a tension-resistance of at least 10 kg/cm, said impregnant-saturated layer having a weight of about 160 g/m$^2$ and said impregnant having approximately the following composition (parts by weight)

| | |
|---|---|
| nitrile rubber | 100 |
| epoxy resin | 100 |
| zinc oxide | 5 |
| stearic acid | 1 |
| sulfur | 3.5 |
| an accelerator for the expoxy resin | 1.5 |
| titanium dioxide | 7.5.] |

[2. A road-marking tape material as defined in claim 1, said impregnant being soluble in a methylethylketone peroxide-toluene solvent, and said layer having a tension resistance of about 20 kg/cm.]

[3. A road-marking tape material, comprising a wear- and skid-resistant upper layer consisting predominantly of a synthetic resin composition having partially protruding particles of a substance having a hardness of at least 6 on the Mohs' Hardness Scale embedded therein; a primer layer firmly attachable to a road surface and consisting predominantly of a bituminous composition; an impregnable intermediate layer sandwiched between said upper and primer layers and forming an interface with each of the same, said intermediate layer being a non-woven fibrous material; and an impregnant composition impregnating said intermediate layer, said impregnant composition containing a rubbery component and being intermixed with said synthetic resin composition adjacent the interface of said upper layer and said intermediate layer and also being intermixed with said bituminous composition adjacent the interface of said primer layer and said intermediate layer.]

*4. A road-marking tape material, comprising a wear and skid resistant upper layer consisting predominantly of a synthetic resin composition having partially protruding particles of a substance having a hardness of at least 6 on the Mohs' Hardness Scale embedded therein; a primer layer firmly attachable to the road surface; an impregnated intermediate layer of highly tension resistant resin non-woven fibrous material sandwiched between said upper layer and primer layer and forming an interface with each*

*of the same; and an impregnant resin composition impregnating said intermediate layer, said impregnant composition being intermixed with said synthetic resin composition adjacent the interface of said upper layer and said intermediate layer and also being intermixed with the composition of the primer layer adjacent the interface of said primer layer and said intermediate layer.*

*5. A road-marking tape material as defined in claim 4, the fibrous non-woven layer being impregnated in its portions adjacent to the upper and to the primer layer by compounds present in said layers.*

*6. A road-marking tape material as defined in claim 4, the fibrous non-woven material being impregnated by bituminous compounds.*

*7. A road-marking tape material as defined in claim 4, the fibrous non-woven material being impregnated by epoxy-bituminous compounds.*

*8. A road-marking tape material, comprising a wear and skid resistant upper layer consisting predominantly of a synthetic resin composition having partially protruding particles of a substance having a hardness of at least 6 on the Mohs' Hardness Scale embedded therein; a primer layer firmly attachable to the road surface, an impregnated first intermediate layer of highly tension resistant resin non-woven fibrous material sandwiched between said upper layer and a second intermediate layer, and an impregnant resinous composition impregnating said first intermediate layer, said impregnant composition being intermixed with said synthetic resin composition adjacent the interface of said upper layer and said impregnated intermediate layer and also being intermixed with the chemical composition of the second intermediate layer adjacent the interface of said impregnated first intermediate layer and said second intermediate layer; the second intermediate layer being sandwiched between said impregnated first intermediate layer and said primer layer, the chemical composition of said second intermediate layer being intermixed with said impregnant resinous composition impregnating said first intermediate layer and also being intermixed with the composition of the primer layer.*

*9. A road-marking tape material, comprising a wear and skid resistant upper layer consisting predominantly of a synthetic resin composition having partially protruding particles of a substance having a hardness of at least 6 on the Mohs' Hardness Scale embedded therein; a primer layer firmly attachable to the road surface; a first intermediate layer sandwiched between said upper layer and a second impregnated intermediate layer of highly tension resistant resin non-woven fibrous material, the chemical composition of said first intermediate layer being intermixed with the synthetic resin composition of the upper layer and said second impregnated intermediate layer, the second impregnated intermediate layer of highly tension resistant resin non-woven fibrous material being sandwiched between said first intermediate layer and said primer layer and forming an interface with each of the same, and an impregnant resin composition impregnating said second intermediate layer, said impregnant composition being intermixed with the chemical composition of said first intermediate layer adjacent the interface of said first intermediate layer and the second impregnated intermediate layer of highly tension resistant resin non-woven fibrous material and also being intermixed with the composition of the primer layer adjacent the interface of said second impregnated intermediate layer and said primer layer.*

* * * * *